(12) United States Patent
Fox, Jr.

(10) Patent No.: US 6,290,177 B1
(45) Date of Patent: Sep. 18, 2001

(54) BI-DIRECTIONAL PILOT PARACHUTE RELEASE ASSEMBLY

(76) Inventor: Roy L. Fox, Jr., Rte. 1, Box 32A, Belleville, WV (US) 26133

( * ) Notice: Subject to any disclaimer, the term of this patent is extended or adjusted under 35 U.S.C. 154(b) by 0 days.

(21) Appl. No.: 09/577,646

(22) Filed: May 24, 2000

(51) Int. Cl.$^7$ .................................................. B64D 17/52

(52) U.S. Cl. ............................................................ 244/149

(58) Field of Search ............................ 244/142, 146–149

(56) References Cited

U.S. PATENT DOCUMENTS 1,944,801 * 1/1934 Nichols ................................ 244/148

FOREIGN PATENT DOCUMENTS

896501 * 7/1959 (GB) ..................................... 244/148

* cited by examiner

Primary Examiner—Galen L. Barefoot
(74) Attorney, Agent, or Firm—Henderson & Sturm LLP

(57) ABSTRACT

A bi-directional pilot parachute release assembly (10) for use with a conventional parachute arrangement (100) including a dual compartment parachute enclosure member (101) having an upper compartment (102) and a lower compartment (103) provided with a bottom panel (104) that is operatively associated with a pilot parachute member (40) dimensioned to be received in a storage unit (11) including a storage panel member (20) having an elongated generally centrally disposed mouth opening (23). The top of the pilot parachute member (40) is provided with a cap member (50) having widely spaced opposite ends (51) provided with hand grip elements (52) that will allow the pilot parachute member (40) to be withdrawn from the storage unit (11) in either a right handed or left handed fashion.

15 Claims, 2 Drawing Sheets

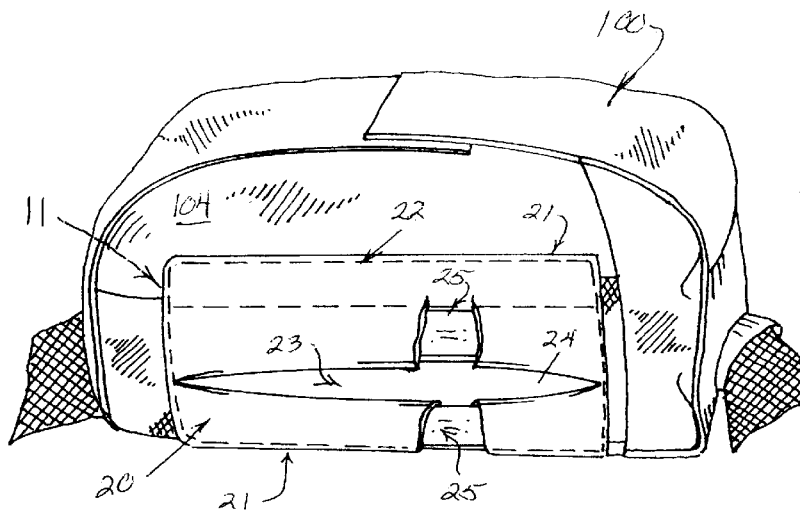
Fig. 4
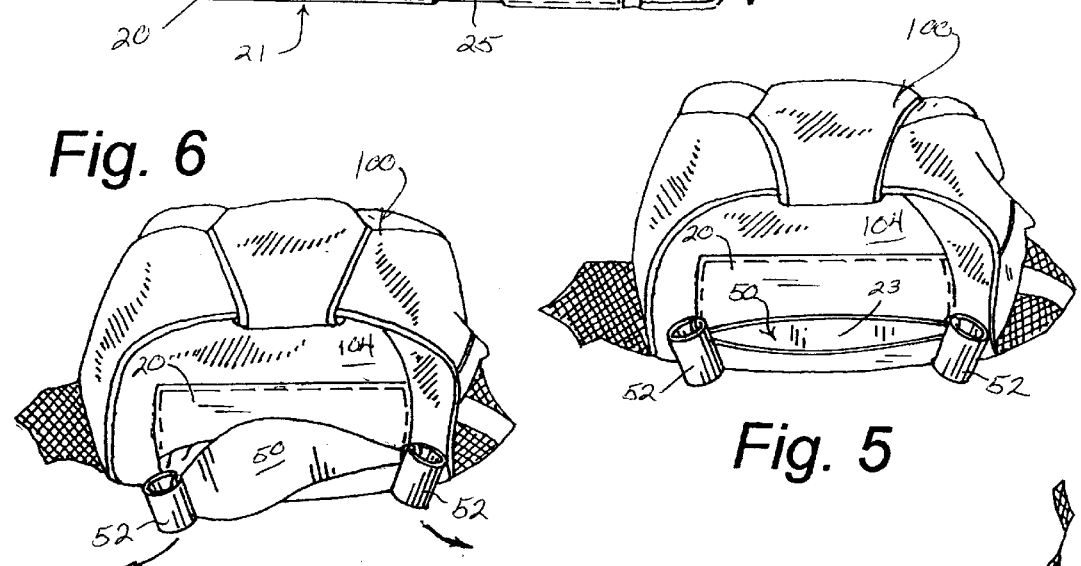
Fig. 6
Fig. 5
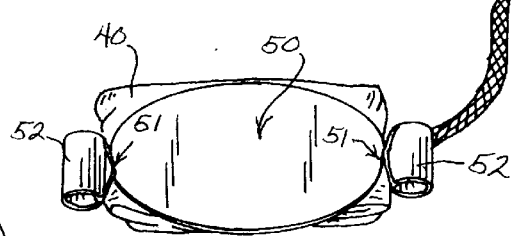
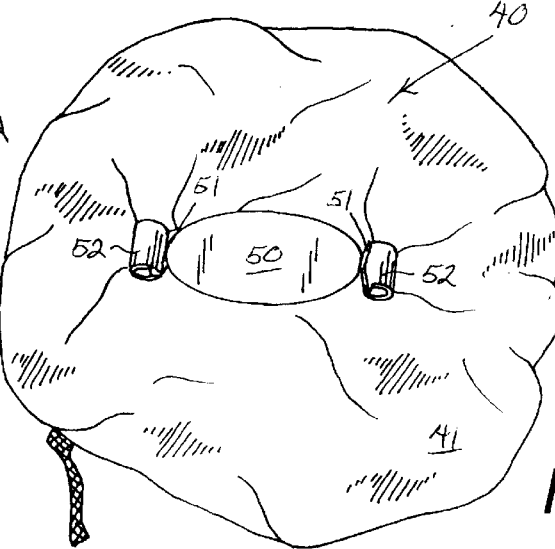
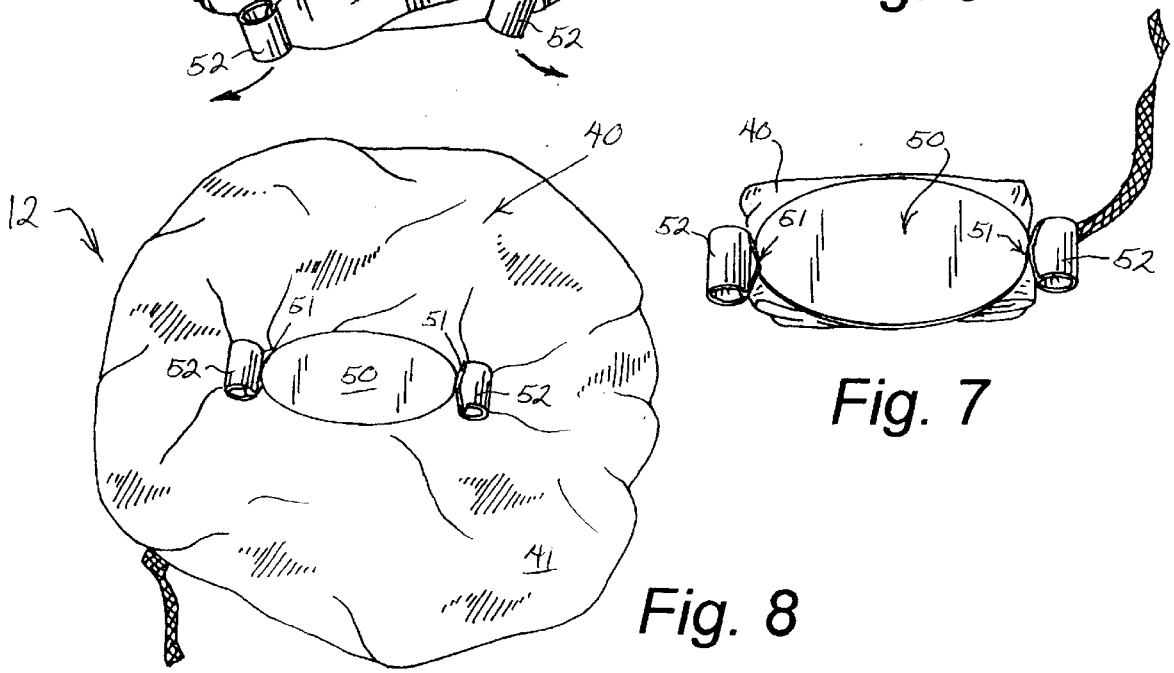
Fig. 7
Fig. 8

BI-DIRECTIONAL PILOT PARACHUTE RELEASE ASSEMBLY

BACKGROUND OF THE INVENTION

1. Field of the Invention

The present invention relates to the field of parachute release devices in general, and in particular to a bi-directional pilot parachute release arrangement that selectively permits either right or left handed actuation.

2. Description of Related Art

As can be seen by reference to the following U.S. Pat. Nos. 2,869,809; 2,922,604; 4,034,940; 4,039,164; 4,898,346; and 5,263,663, the prior art is replete with myriad and diverse parachute release arrangements.

While all of the aforementioned prior art constructions are more than adequate for the basic purpose and function for which they have been specifically designed, they are uniformly deficient with respect to their failure to provide a simple, efficient, and practical method and apparatus that will allow a single sky diver or a skydiving student assisted by one or more instructors to selectively deploy a pilot parachute in either a right handed or left handed "throw out" into the airstream.

Modern free fall parachute equipment has evolved from emergency bail out parachutes which the military forces have been using since before World War II. All free fall type parachute systems require a relatively small pilot parachute that can somehow be launched into the free flow airstream to deploy the main parachute.

The typical emergency parachute used, and still uses, a pilot parachute which typically contains a large coil spring which self launches the pilot parachute after it is released from the parachute container as the result of a ripcord being pulled. Since the unskilled parachutist will typically fall with their back toward the earth with their head lower than their feet, the pilot parachute will typically launch immediately after being released from its container even though it may tangle with a tumbling parachutist. It was also learned in the early years of skydiving, where the parachutist typically falls in a stable, face to earth position, that the spring launched pilot parachute would sometimes get aerodynamically trapped in the low air pressure area above the free falling body. This would lead to a delayed deployment of the main parachute or worse.

To alleviate the spring launched pilot parachute problem for skydivers, in the 1970's William Booth of DeLand, Fla. invented U.S. Pat. No. 4,039,164, a "hand deployed" pilot parachute. In this design, no ripcord is used and the pilot parachute has no spring. The soft fabric pilot parachute is simply folded and placed in an elastic pocket in a convenient location for the parachutist to reach so that it can be thrown to the side into the airstream. Today, the pocket is typically oriented laterally on the bottom of the main parachute container which places it near the small of the back or hips of the parachutist. A handle is affixed to the apex of the pilot parachute, which protrudes from the mouth of the pocket, and the mouth is oriented for the pilot parachute to be extracted from the right hand side. In some instances this arrangement is reversed for left hand operation. This arrangement has worked well for all but one group of skydivers—the AFF (Accelerated Free Fall) students.

AFF students are taken to high altitude where they make a lengthy free fall with two instructors—one holding the student from the left side and one holding from the right side. After many years of using a spring launched pilot parachute with a left and a right side ripcord, AFF students are now sometimes being trained with the hand deployed pilot parachute system. With today's standard hand deployed pilot parachute configuration, only the right side instructor can deploy the pilot parachute, if the student doesn't. With a pocket modified for AFF students, the left side instructor can cause the pilot parachute pocket to open along its length, but cannot actually deploy the pilot parachute into the free flow airstream and, therefore, there is no assurance that the pilot parachute will not delay and this increases the chances for some sort of entanglement. In reality, this configuration, if released from the left side is almost certain to be less reliable than the spring launched pilot parachute which it has replaced.

As a consequence of the foregoing situation, there has existed a longstanding need for a new and improved bi-directional pilot parachute deployment arrangement that will allow the pilot parachute to be selectively released from either the skydiver's right or left hand side, and the provision of such an arrangement is a stated objective of the present invention.

BRIEF SUMMARY OF THE INVENTION

Briefly stated, in a successful attempt to overcome the shortcomings of the prior art and provide enhanced safety, a new pilot parachute and pocket configuration has been developed which forms the basis of the present invention. This pilot parachute, instead of having a single handle in the very center of the canopy, has two handles separated by a few inches left and right of center. The separation is maintained by a semi-rigid cap which is rectangular or oval in shape.

The pocket designed for this new pilot parachute configuration is made with a centrally located slit running along its length. The pilot parachute is folded to the approximate size and shape of the cap and inserted into the pocket in such a way that the canopy fabric is covered by the cap. Exposure is limited to only the center portion of the stiffened cap and the two deployment handles. One handle emerges from each end of the pocket slit.

This pilot parachute and pocket design allows either the left side or right side instructor to actually deploy the pilot parachute into the airstream. Unlike any other system, it also gives the student, or any parachutist, the option of using either hand, in an emergency, for deploying the pilot parachute which can be claimed as a safety feature for anyone using this system.

To make a very simple analogy: think of the standard configuration as a hip pocket on your trousers with the opening facing to the right, instead of to the top, and then pulling a handkerchief, having a handle, from it; easy with the right hand, but very difficult with the left hand. Think of the bi-directional pilot parachute as a standard size box of tissues, worn as a fanny pack, with a handle protruding from each end of the slitted opening. In this configuration, the left handle can be conveniently pulled from the left side or the right handle can be conveniently pulled from the right side. In either instance, the tissue is easily pulled from the box.

The pilot parachute pocket can be made of elastic on non-elastic material. The grip along the mouth of the pocket can be further controlled by the use of elastic cords, elastic straps, rigid or semi-rigid ribs, or slats, loops and pins, tuck tabs and pockets, snaps or hook and loop fasteners. The preferred embodiment is a pocket of non-elastic material with the mouth grip tension controlled by the use of semi-rigid plastic ribs along the pocket mouth.

While in the pocket, it is important that the two pilot parachute handles maintain their relative separation. This is most conveniently done by somewhat stiffening the top center portion of the pilot parachute. However, separation distance can be maintained by using various types of fasteners such as snaps, elastic keepers, tuck tabs and pockets, loops and pins or hook and loop fasteners.

It is essential that the configuration allows for the grip of the pilot parachute pocket and the degree of stiffness of the pilot parachute crown area to be such that it is not likely that the pilot parachute will inadvertently fall from the pocket, yet it must allow for easy withdrawal when deployment is desired.

The pilot parachute pocket length and the separation distance between the two pilot parachute handles should be approximately equal. For a conventional skydiving parachute assembly, the pilot parachute pocket dimensions may range from approximately seven inches to approximately nine inches along the longitudinal axis. In the vertical axis, the pocket may range from approximately four inches to approximately seven inches. Logically, if the parachute assembly is larger or smaller than the typical skydiving assembly, the pilot parachute assembly dimensions can be scaled up or down, as required.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 4 is a partial cut away view of the pilot parachute storage compartment;

FIG. 5 is a perspective view of the pilot parachute stored within the storage compartment;

FIG. 6 is a perspective view of the pilot parachute partially deployed from the storage compartment;

FIG. 7 is an isolated perspective view of the pilot parachute in the folded position; and FIG. 8 is an isolated perspective view of the pilot parachute in the open uninflated position.

DETAILED DESCRIPTION OF THE INVENTION

Figure 1:
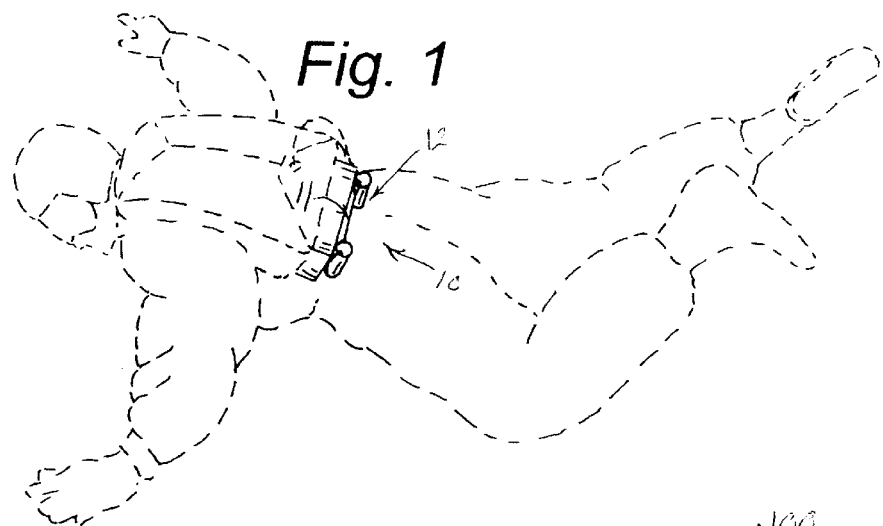
FIG. 1 is a perspective view of the bi-directional pilot parachute release arrangement that forms the basis of the present invention.

As can be seen by reference to the drawings, and in particular to FIG. 1, the bi-directional pilot parachute release assembly that forms the basis of the present invention is designated generally by the reference number 10. The release assembly 10 comprises in general a storage unit 11, and a pilot parachute unit 12. These units will now be described in seriatim fashion.

Prior to embarking on a detailed discussion of the improvements embodied in the present invention, it would be advisable to first discuss the prior art arrangement that this invention is intended to replace.

Figure 2:
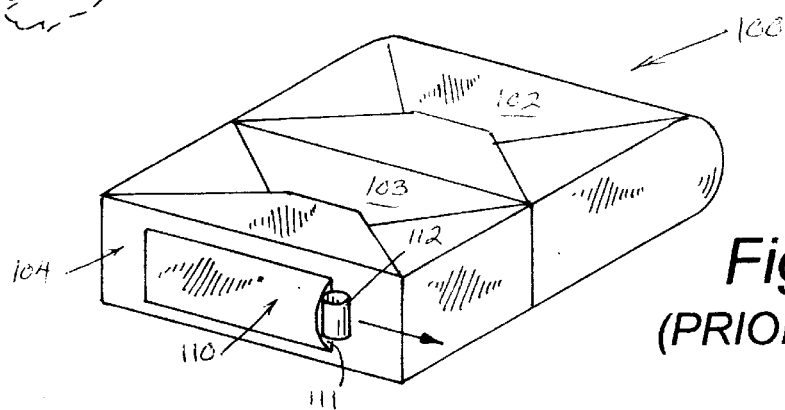
FIG. 2 is a perspective view of the prior art Booth arrangement.

As shown in FIG. 2, the Booth arrangement is labeled as prior art and comprises a conventional parachute arrangement designated generally as 100 and including a dual compartment parachute enclosure member 101. The upper compartment 102 stores the reserve parachute (not shown) and the lower compartment 103 which includes a bottom panel 104 stores the main parachute (not shown).

In the arrangement developed by Booth and shown and described in U.S. Pat. No. 4,039,164 the patentable improvement revolved around the provision of an elongated generally rectangular auxiliary storage pocket 110 formed on the bottom panel 104 of the conventional parachute arrangement 100 and having a single opening 111 formed on one of the longitudinal ends of the auxiliary storage pocket 110.

In addition, the auxiliary storage pocket 110 was dimensioned to receive a folded pilot parachute (not shown) having a single looped handle 112 that was attached to the top of the pilot parachute.

Figure 3:
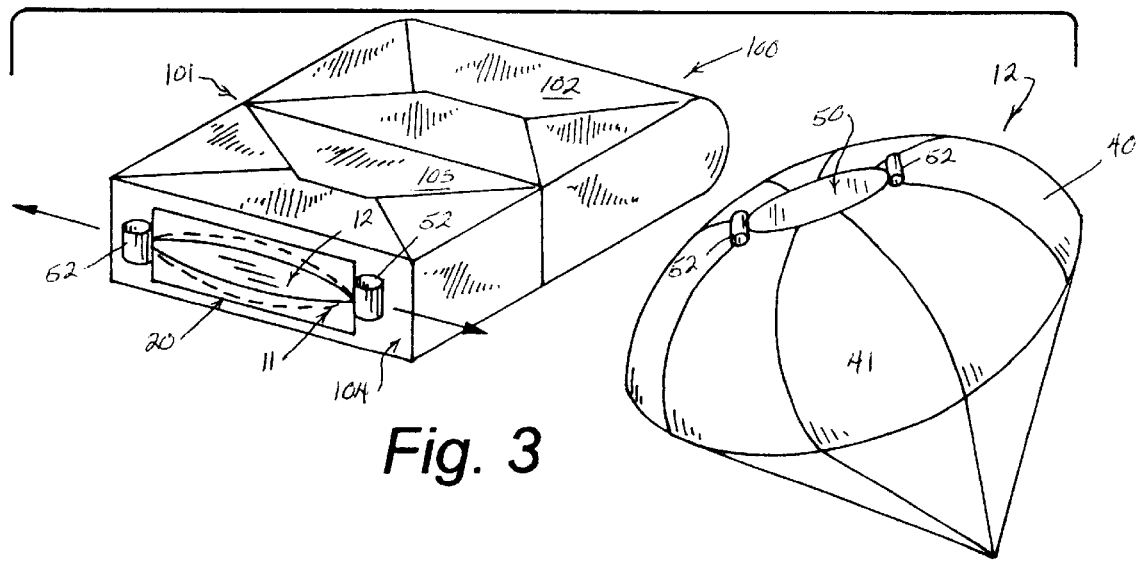
FIG. 3 is an isolated perspective view of the pilot parachute in the stored and deployed modes.

As can be seen by a comparison of FIGS. 2 and 3, the storage unit 11 of the present invention is substantially different than the storage pocket 110 of the prior art device. As shown in FIGS. 2, 4, and 5, the storage unit 11 comprises an elongated rectangular storage panel member 20 whose peripheral edges 21 are fixedly secured to the bottom panel 104 of the parachute enclosure member 101 such as by stitching 22 or the like.

In addition, the storage panel member 20 is provided with an elongated mouth opening 23 that forms the mouth of an internal storage compartment 24 that is defined by the opposed external face of the bottom panel 104 of the parachute arrangement 100 and the internal face of the storage panel member 20. The storage compartment 24 is dimensioned to receive the pilot parachute unit 12.

It should further be noted that the elongated opening 23 is aligned with and/or disposed parallel to the longitudinal axis of the storage panel member 20 for reasons that will be explained presently.

In the preferred embodiment of the invention illustrated in FIG. 4, it can be seen that the upper and lower portions of the elongated mouth opening 23 are provided with tensioning element 25 that are provided to bias the mouth opening 23 into the closed position to normally retain a pilot parachute unit 12 (not shown) within the confines of the interior compartment 24 in a well recognized manner.

Furthermore, while the tensioning elements 25 of FIG. 5 are depicted as a pair of ribs or flexible slats that are associated with the upper and lower lip portions of the elongated mouth opening 23, these tensioning elements 25 could also comprise an elastic band sewn around the periphery of the mouth opening 23 or any other suitable arrangement that would retain the mouth opening 23 in a generally closed disposition.

As can be seen in particular to FIG. 8, the pilot parachute unit 12 comprises in general, a pilot parachute canopy member 40 formed from suitable parachute fabric 41. The center of the pilot parachute canopy member 40 is provided with an elongated relatively stiff cap member 50 fabricated from ballistic cloth having a generally oval configuration. The narrow ends 51 of the cap member 50 are provided with handle grip elements 52 that may be in the form of hollow cylinders, spherical balls, or the like.

In order to best appreciate the operation of the parachute release assembly 10 of this invention, it is advisable to review FIGS. 5 through 8 in reverse order. The pilot parachute unit 12 is first depicted in an unfolded orientation. This phase is followed by a standard folding procedure wherein the pilot parachute member 40 assumes a compact configuration with the cap member 50 and hand grip elements 52, 52 on top.

The folded pilot parachute member 40 is then inserted through the mouth opening 23 and into the interior compartment 24 of the storage unit 11. Then the upper and lower edges of the cap member 50 are inserted through the deformable mouth opening 23 so that only the hand grip elements 52 are disposed outside of the mouth opening 23 and readily accessible from either side of the conventional parachute arrangement 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A bi-directional pilot parachute release assembly in combination with a conventional parachute arrangement including a dual compartment parachute enclosure member having an upper compartment and a lower compartment provided with a bottom panel operatively associated with a pilot parachute member wherein the release assembly comprises:

means for releasably connecting the pilot parachute member to the bottom panel of the parachute enclosure member; and a cap member secured to the top of the pilot parachute member and having opposite ends provided with widely spaced hand grip elements each adapted to selectively disengage the pilot parachute member from engagement with said bottom panel.

2. The release assembly as in claim 1 wherein said means for releasably connecting the pilot parachute member to the bottom panel of the parachute enclosure member comprises: a storage unit includes a storage panel member having an elongated generally centrally disposed mouth opening dimensioned to receive the pilot parachute member and said cap member wherein said hand grip elements are disposed outside of said mouth opening.

3. The release assembly as in claim 2 wherein the entire exterior periphery of said storage panel member is fixedly secured to said bottom panel.

4. The release assembly as in claim 3 wherein said storage panel member has an elongated rectangular configuration having a longitudinal axis wherein said elongated mouth opening is aligned relative to said longitudinal axis.

5. The release assembly as in claim 4 wherein said mouth opening is disposed parallel to said longitudinal axis.

6. The release assembly as in claim 4 wherein said mouth opening is disposed on the longitudinal axis.

7. The release assembly as in claim 4 wherein said cap member has an elongated oval configuration.

8. The release assembly as in claim 7 wherein the narrow ends of the elongated oval cap member are provided with the hand grip elements.

9. The release assembly as in claim 1 wherein the hand grip elements have a cylindrical configuration.

10. The release assembly as in claim 1 wherein the hand grip elements have a hollow cylindrical configuration.

11. The release assembly as in claim 8 wherein the hand grip elements have a cylindrical configuration.

12. The release assembly as in claim 8 wherein the hand grip elements have a hollow cylindrical configuration.

13. The release assembly as in claim 2 wherein said elongated mouth opening is further provided with:

means for maintaining said mouth opening in a biased closed disposition.

14. The release assembly as in claim 2 wherein the elongated mouth opening has an upper lip portion and a lower lip portion both provided with tensioning elements.

15. The release assembly as in claim 7 wherein said cap member is fabricated from ballistic cloth.

* * * * *